US012326801B2

(12) United States Patent
Bussa et al.

(10) Patent No.: US 12,326,801 B2
(45) Date of Patent: Jun. 10, 2025

(54) SYSTEM AND METHOD FOR GENERATING NON-FUNGIBLE TOKEN-BASED TEST SUITES FROM DESIGN DIAGRAMS

(71) Applicant: Bank of America Corporation, Charlotte, NC (US)

(72) Inventors: Swathi Bussa, Telangana (IN); Savitri Jaganath Podal, Mumbai (IN); Vaddi Sreenivasulu Reddy, Telangana (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 450 days.

(21) Appl. No.: 17/817,282

(22) Filed: Aug. 3, 2022

(65) Prior Publication Data

US 2024/0045790 A1 Feb. 8, 2024

(51) Int. Cl.
| | |
|---|---|
| *G06F 11/3668* | (2025.01) |
| *G06F 8/30* | (2018.01) |
| *G06F 8/34* | (2018.01) |
| *G06F 21/10* | (2013.01) |
| *G06V 30/19* | (2022.01) |
| *H04L 9/00* | (2022.01) |
| *H04L 9/32* | (2006.01) |

(52) U.S. Cl.
CPC ............. *G06F 11/368* (2013.01); *G06F 8/31* (2013.01); *G06F 8/34* (2013.01); *G06F 11/3684* (2013.01); *G06F 21/1014* (2023.08); *G06F 21/1015* (2023.08); *G06V 30/19167* (2022.01); *H04L 9/32* (2013.01); *H04L 9/50* (2022.05); *G06F 11/3688* (2013.01)

(58) Field of Classification Search
None
See application file for complete search history.

(56) References Cited

U.S. PATENT DOCUMENTS

| | | |
|---|---|---|
| 8,527,262 B2 | 9/2013 | Kambhatla et al. |
| 8,955,005 B2 | 2/2015 | Gava et al. |
| 9,486,708 B2 | 11/2016 | Driemeyer et al. |
| 9,721,193 B2 | 8/2017 | King et al. |
| 9,794,797 B2 | 10/2017 | Hoffberg |
| 9,983,852 B2 | 5/2018 | Ravindran et al. |
| 10,560,468 B2 | 2/2020 | Muddu et al. |
| 11,055,199 B2 | 7/2021 | Natari |
| 11,099,237 B2 | 8/2021 | Nochilur et al. |

(Continued)

*Primary Examiner* — Qing Chen (57) ABSTRACT

A system for generating non-fungible token-based test suites from design diagrams comprises a processor associated with a server. The processor is configured to obtain image objects representing a workflow associated with a design diagram and a user profile of a user. The processor is configured to generate a design non-fungible token (NFT) associated with the design diagram to verify a design diagram ownership. The processor is configured to convert the image objects of the design diagram into corresponding text objects and to process the corresponding text objects of the design diagram to generate a plurality of text datasets corresponding to the workflow of the design diagram, analyze the plurality of text datasets and generate a test suite which comprises a set of test scripts corresponding to the design diagram, and generate a test case NFT associated with the test suite to verify a test suite ownership.

18 Claims, 2 Drawing Sheets

(56) References Cited

U.S. PATENT DOCUMENTS

| | | |
|---|---|---|
| 11,354,782 B2 | 6/2022 | Chui et al. |
| 2018/0101842 A1 | 4/2018 | Ventura et al. |
| 2019/0333030 A1 | 10/2019 | Ramasamy et al. |
| 2021/0256070 A1 | 8/2021 | Tran et al. |
| 2021/0357489 A1 | 11/2021 | Tali et al. |
| 2022/0019448 A1 | 1/2022 | Krishnamoorthy et al. |
| 2022/0040557 A1 | 2/2022 | Tran |
| 2023/0006976 A1* | 1/2023 | Jakobsson ................ H04L 9/50 |
| 2023/0011621 A1* | 1/2023 | Jakobsson ............. H04L 9/3213 |
| 2023/0126386 A1* | 4/2023 | Kurian ................. H04L 63/126 |
| | | 705/76 |
| 2023/0377056 A1* | 11/2023 | Yang ....................... A63F 13/67 |

* cited by examiner

SYSTEM AND METHOD FOR GENERATING NON-FUNGIBLE TOKEN-BASED TEST SUITES FROM DESIGN DIAGRAMS

TECHNICAL FIELD

The present disclosure relates generally to software engineering and information security, and more specifically to a system and method for generating non-fungible token (NFT) based test suites from design diagrams.

BACKGROUND

Changes to an application product may occur dynamically in a continuous integration/continuous deployment (CI/CD) pipeline process. Quality assurance assessment and analysis is important to facilitate and enhance the application product development from design, development, test through release and maintenance. Test suite preparation and execution is important to ensure software quality and development process. However, these operations are inefficiently performed and can cause defect leakage. Current information security control technologies are not configured to provide a reliable and efficient solution to provide the corresponding test suite preparation and execution associate with the application product.

SUMMARY

Conventional technology is not configured to provide reliable and efficient solutions to provide an ownership verification of design diagrams and corresponding test suites associated with an application product in a continuous integration/continuous deployment (CI/CD) pipeline process. The system described in the present disclosure is particularly integrated into a practical application and provides technical solutions to the technical problems of previous systems.

In one embodiment, the system for generating non-fungible token (NFT) based test suites from design diagrams comprises a processor and a memory. The processor obtains a plurality of image objects associated with a first design diagram and a first user profile of a first user. The plurality of the image objects represents a workflow which comprises a plurality of diagram shapes, functional diagram contexts, and logic conditions between different diagram shapes and functional diagram contexts. The processor generates a design non-fungible token (NFT) associated with the first design diagram and the first user profile. The design NFT is configured to verify an ownership of the first design diagram and to allow a user device associated with the first user to access and modify the first design diagram. The processor converts the plurality of image objects associated with the first design diagram into corresponding text objects by applying an optical character recognition (OCR) pattern-based algorithm. The processor processes the corresponding text objects of the first design diagram using a learning model to generate a plurality of text datasets corresponding to the workflow of the first design diagram. The processor applies a natural language processing algorithm to analyze the plurality of the text datasets and to generate a first test suite which comprises a set of test scripts corresponding to the first design diagram. The processor generates a first test case NFT associated with the test suite and the set of the test scripts. The first test case NFT is configured to verify an ownership of the test suite.

In one embodiment, the processor couples and stores in the memory the design NFT and the first test case NFT associated with the test suite with metadata information to facilitate a verification of the ownership associated with the test suite. The metadata information includes one or more user login credentials stored in the first user profile. The processor derives the test suite from the memory based on the design NFT and the first test case NFT to verify the ownership associated with the test suite. The processor executes the test suite for an automatic deployment in a continuous integration and continuous deployment system.

In one embodiment, the processor detects a check-in signal to access the first design diagram from the user device, verifies the design NFT associated with the first design diagram and the first user profile to verify the corresponding ownership and allow the user device to access the first design diagram. The processor receives a new version of the first design diagram from the user device, compares the first design diagram to the new version of the design diagram to determine one or more changes made to the first design diagram, and determines whether to generate a new version test suite or to modify a portion of the test suite based on a threshold and the one or more changes made to the first design diagram. Further, in response to determining that the one or more changes are above or equal to the threshold, the processor generates the new version test suite based on the one or more changes made to the design diagram, generates a second test case NFT associated with the new version test suite, and couples and stores in the memory the design NFT and the second test case NFT associated with the new version test suite with metadata information to facilitate a verification of the ownership associated with the new version test suite. Further, in response to determining that the one or more changes are below the threshold, the processor modifies the portion of the test suite corresponding to the one or more changes made to the first design diagram and generates a third test case NFT associated with the portion of the test suite. The processor couples and stores in the memory the design NFT and the third test case NFT associated with the portion of the test suite with metadata information to facilitate a verification of the ownership associated with the test suite.

The system described in the present disclosure provides technical solutions to the technical problems of the previous systems. The disclosed system is related to an application development process associated with a server that provides a practical application in the CI/CD pipeline process. For example, the learning system includes a learning model, an OCR pattern-based algorithm, a natural language processing algorithm, and other software models or modules. The learning system may be integrated into a software application associated with a server to process design diagrams associated with the application product and generate NFT based test suites from the design diagrams. The disclosed system may further be integrated into an additional practical application of improving the underlying operations that are tasked to carry out operations to generate a design non-fungible token (NFT) associated with a design diagram to verify an ownership of the design diagram and generate a test case NFT associated with the test suite and the set of the test scripts to verify an ownership of the test suite. Further, the practical application improves the underlying operations of determining one or more changes made to the design diagram in response to receiving a new version of the design diagram and determining whether to generate a new version test suite or to modify a portion of the test suite associated with the application product in the CI/CD pipeline process.

Thus, the disclosed system improves the application production quality assurance with ownership certification and increases an efficiency of the application product development in the CI/CD pipeline process. When new requirement changes are planned before releasing an application product, the disclosed system provides effective and efficient solutions for the application product development by automatically and dynamically modifying existing test scripts or generating new test scripts corresponding to the requirement changes. Further, the disclosed system provides an automatic ownership verification for modifying the corresponding design diagrams and test suites so that corresponding changes to the development codes may be promoted to the production faster during the application product release. By generating corresponding test suites automatically while preventing processing uncertified interactions with the design diagrams and avoiding manual operations, the disclosed system conserves processing and memory resources used for the application product development in the CI/CD pipeline process and the computer system overall.

The disclosed system provides several technical advantages that overcome the previously discussed technical problems. The disclosed system is related to an application development process associated with a server that provides a practical application that improves the application production quality assurance with corresponding ownership proof in the CI/CD pipeline process. The disclosed system provides a technical advantage that increases information security because it provides a fast and effective way to provide ownership certification for accessing and modifying the design diagrams and generating NFT based test suite from the design diagrams. For example, this process may be employed to authenticate and validate the check-ins to requirement documents and use case design diagrams before allowing the users with corresponding ownerships to modify and update the test suites associated with the design diagrams. In addition, this process uses deep learning-based image processing and natural language processing technology to achieve a requirement traceability through operations of processing image diagrams, generating test suites with test scripts and conducting automatic test scripts scheduling in the CI/CD pipeline process. The disclosed system may improve the current design diagrams and test scripts quality assessment and ownership verification to backtrack production issues and prevent any defects in the CI/CD pipeline process in a computer network. For example, using the current technology where the ownerships associated with design diagrams and corresponding test suites and test scripts may have remained undetermined or uncertified, which may lead to unsecured and anomalous actions on the application product design, development, test, and employment operations in the CI/CD pipeline process. This further leads the processors and memories of a computer system to have to process uncertified interactions, which leads to insecurity actions and data loss. The disclosed system may improve application product quality assessment and ownership verification and further improve information security and data loss prevention. By preventing malicious interactions and modification defects to design diagrams and test suites from uncertified users or entities, the disclosed system can prevent any unnecessary increases in the number of network resources and bandwidth that are consumed that would otherwise negatively impact on information security of an organization entity and the throughput of the computer system. For example, the disclosed system may identify and fix risks and insecure matters or features quickly and earlier before the application product is released compared to the current technology. Thus, the network communication bandwidth among the computer systems is not wasted and the disclosed processes improve the operations of the CI/CD pipeline process and the computer system overall.

Accordingly, the disclosed system may be integrated into a practical application of improving processing a large number of design diagrams and generating corresponding ownership verification for test suites and test scripts simultaneously, which further improves memory storage capacity utilization for that would otherwise be spent using the current technology. Thus, the disclosed system may provide an effective and efficient process to integrate operations of application product design, development, ownership verification and quality assessment associated with design diagrams and test suites, and further to generate reusability of testing suites and test scripts with more productivity.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
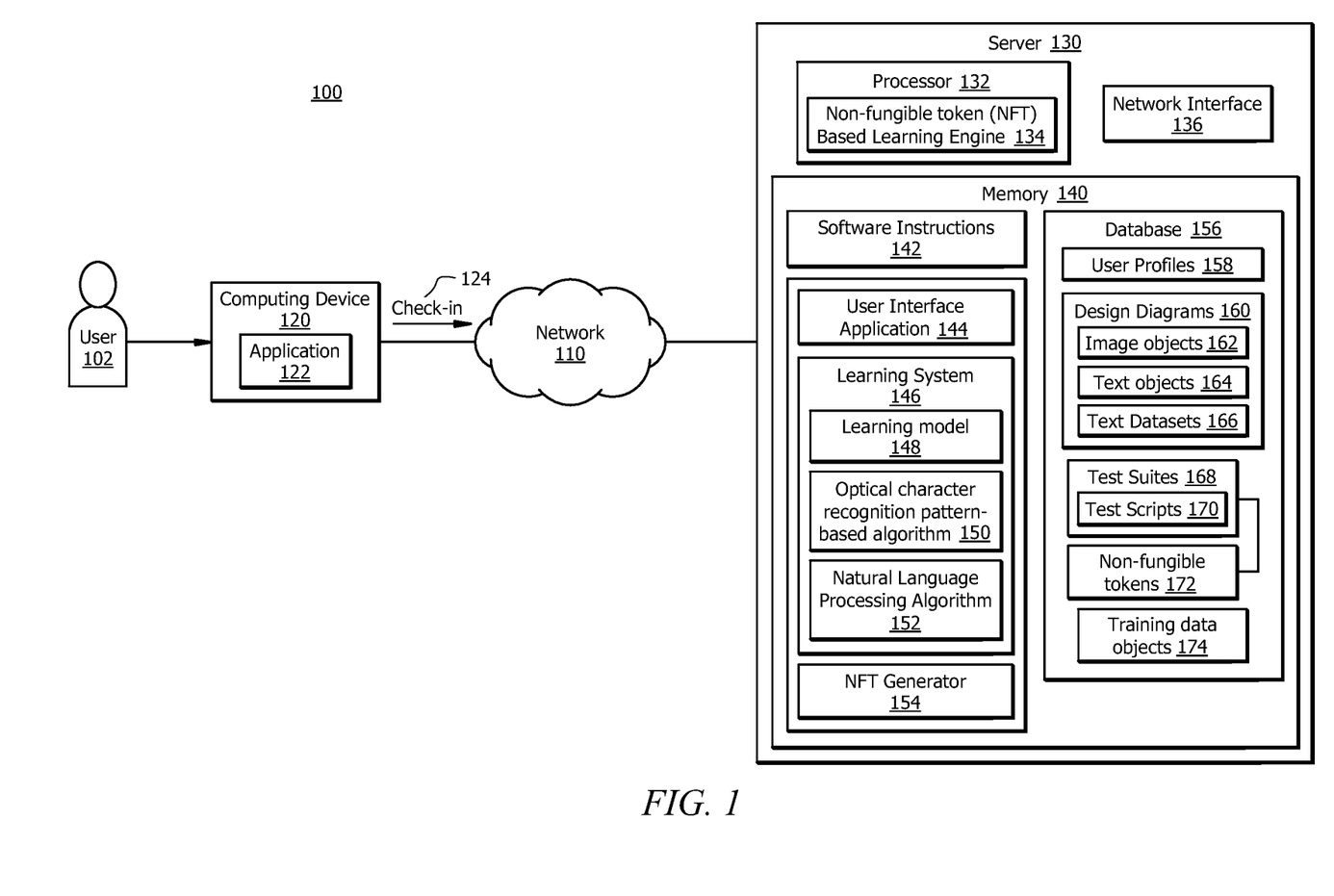
FIG. 1 illustrates an embodiment of a system configured to generate a non-fungible token-based test suite from a design diagram according to an illustrative embodiment of the present disclosure.
Figure 2:
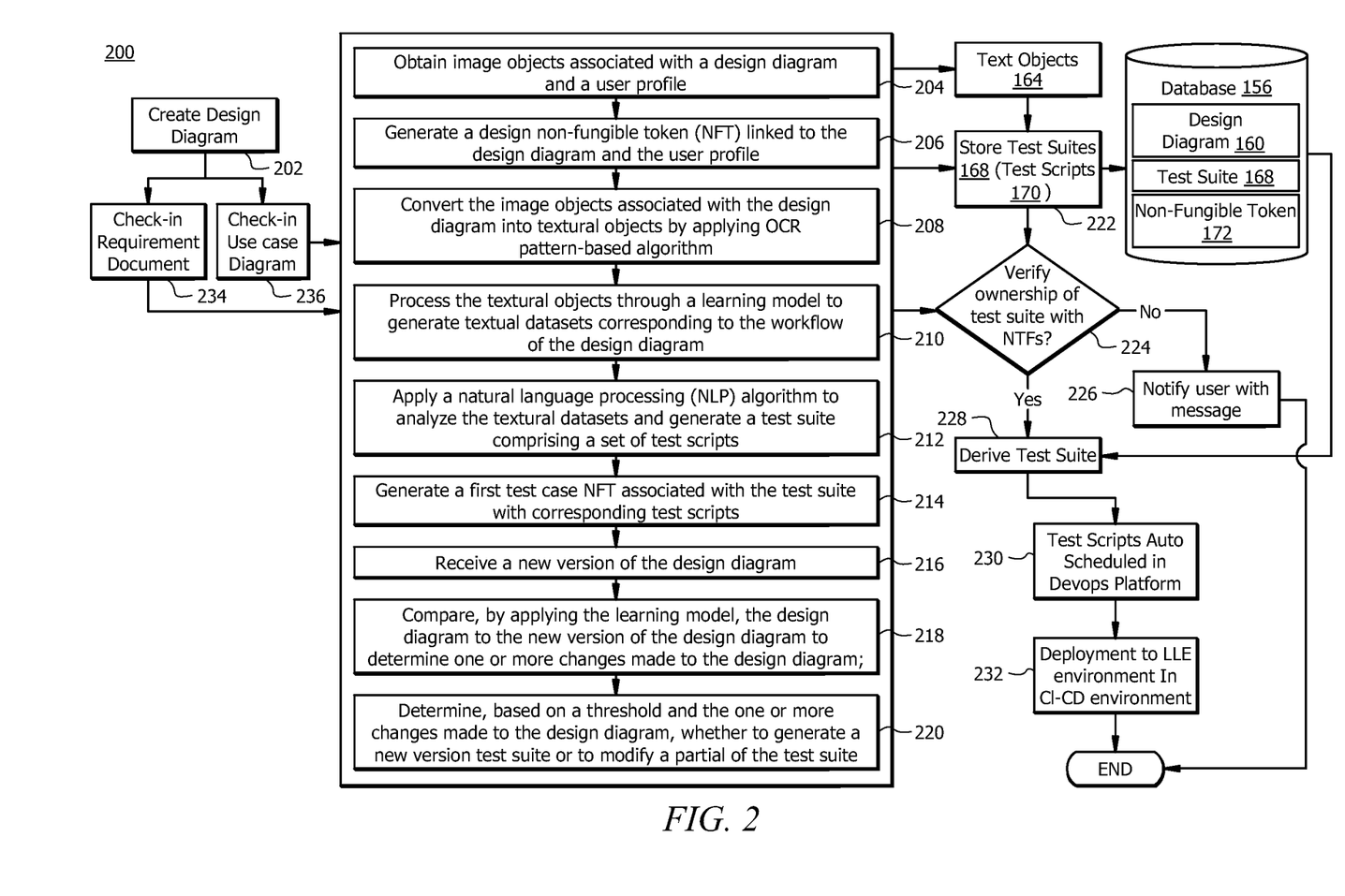
FIG. 2 illustrates an example operational flow of a method for generating the non-fungible token-based test suite from the design diagram.

As described above, previous technologies fail to provide efficient and reliable solutions to provide an ownership verification of design diagrams and corresponding test suites associated with an application product in a continuous integration/continuous deployment (CI/CD) pipeline process. This disclosure provides various systems and methods to generate non-fungible token (NFT) based test suites from design diagrams in the CI/CD pipeline process. FIG. 1 illustrates an embodiment of a system configured to generate a non-fungible token-based test suite from a design diagram according to an illustrative embodiment of the present disclosure. FIG. 2 illustrates an example operational flow of a method for generating the non-fungible token-based test suite from the design diagram.

Example System for Generating NFT Based Test Suite from Design Diagrams

FIG. 1 illustrates one embodiment of a system 100 that is configured to generate non-fungible token (NFT) based test suites from design diagrams in the CI/CD pipeline process. In one embodiment, system 100 comprises a server 130. In some embodiments, system 100 further comprises a network 110, computing device 120, and a server 130. Network 110 enables the communication between components of the system 100. Server 130 comprises a server 130 in signal communication with a memory 140. Memory 140 stores software instructions 142 that when executed by the server 130, cause the server 130 to execute one or more functions described herein. For example, when the software instructions 142 are executed, the server 130 executes a NFT based learning engine 134 to perform operations in the method 200 illustrated in FIG. 2. In other embodiments, system 100 may not have all the components listed and/or may have other elements instead of, or in addition to, those listed above.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with a user 102. Examples of the computing device 120 (e.g., a user device) include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. The hardware processor may include one or more processors operably coupled to the memory. The one or more processors may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors may be a programmable logic device, a microcontroller, a microprocessor, or any suitable combination of the preceding. The one or more processors are configured to process data and may be implemented in hardware or software. For example, the processor may be 8-bit, 16-bit, 32-bit, 64-bit, or of any other suitable architecture. The processor may include an arithmetic logic unit (ALU) for performing arithmetic and logic operations. For example, a software application designed using software code may be stored in the memory and executed by the processor to perform the functions of the computing device 120.

The computing device 120 stores and/or includes the application 122. The application 122 may be a software, mobile, or web application 122. Application 122 can be accessed from the computing device 120. The application 122 may be associated with an organization entity that provides services and/or products to users 102. Application 122 may be generally configured to receive user check-ins, image diagrams and user profile information, and create user account login credentials to the application 122 to allow the user 102 to access their user profile 158 via their computing device 120 upon an approval of the organization entity. The user profile 158 may be stored in one or more databases communicatively coupled with the components of the system 100. For example, after the user profile 158 is approved by the server 130, a user 102 may create their login credentials to the application 122. The user 102 may access their user profile 158 by providing their login credentials to the application 122. A server associated with the application 122 (e.g., server 130) may be configured to evaluate whether the provided login credentials are valid based on comparing the provided login credentials with login credentials previously set by the user 102 and stored in a memory 140. Upon validating the login credentials, the user 102 may access their user profile and profile data stored in their user profile 158.

Server

Server 130 is generally a server, or any other device configured to process data and communicate with computing devices (e.g., computing device 120), etc., via the network 110. The server 130 is generally configured to oversee the operations of the NFT based learning engine 134, as described further below in conjunction with the operational flows of the method 200 described in FIG. 2. The server 130 may be a central server implemented in the cloud and may also be organized in a distributed manner.

Server 130 comprises one or more processors operably coupled to the memory 140. The server 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 142) to implement the NFT based learning engine 134. In this way, the processor 132 may be a special-purpose computer designed to implement the functions disclosed herein. In one embodiment, the processor 132 is implemented using logic units, FPGAs, ASICs, DSPs, or any other suitable hardware. The processor 132 is configured to operate to perform one or more operations as described in FIG. 2.

Network interface 136 is configured to enable wired and/or wireless communications (e.g., via network 110). The network interface 136 is configured to communicate data between the server 130 and other devices (e.g., computing device 120), databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be implemented using one or more disks, tape drives, solid-state drives, and/or the like. Memory 140 is operable to store the software instructions 142 and/or any other data or instructions. The software instructions 142 may store any suitable set of instructions, logic, rules, or code operable to be executed by the processor 132 to implement the processes and embodiments described below. In an example operation, the memory 140 may store a user interface application 144, a learning system 146, a non-fungible token (NFT) generator 154, and other program modules which are implemented in computer-executable software instructions, such as software instructions 142. The learning system 146 may include a learning model 148, an optical character recognition (OCR) pattern-based algorithm 150, a natural language processing (NLP) algorithm 152, and one or more the machine learning models executed by the processor 132 to implement operational flows of FIG. 2. A learning system 146 is configured to conduct image data processing on the plurality of the design diagrams to generate corresponding test suites. The learning system 146 may include the machine learning models which may be implemented by a plurality of neural network (NN) layers, Convolutional NN (CNN) layers, Long-Short-Term-Memory (LSTM) layers, Bi-directional LSTM layers, Recurrent NN (RNN) layers, and the like. For example, the learning system 146 may include a Generative Adversarial Network (GAN). The GAN may be a self-attention generative adversarial network (SAGAN). The self-attention mechanism may include attention-driven long-range dependency modeling for image generation. Attention functions may complement convolution operations and help the network capture fine details.

Database 156 may be a remote database, a cloud database, or an on-site internal database. Database 156 may be coupled to or in communication with and accessed by the server 130 via the network 110. As illustrated in FIG. 1, the database 156 is an internal database and store information including user profiles 158, design diagrams 160, test suites 168, test scripts 170, non-fungible tokens 172, and training data objects 174. The database 156 stores a plurality of design diagrams 160. Each design diagram is associated with at least one user profile 158. Each user profile includes user metadata information including one or more user login credentials and generated non-fungible tokens to permit a corresponding user to access and modify one or more corresponding design diagrams and test suites.

Non-Fungible Token (NFT) Based Learning Engine

NFT based learning engine 134 may include, but is not limited to, one or more separate and independent software and/or hardware components of a server 130. In one embodiment, the NFT based learning engine 134 may be implemented by the processor 132 by executing the software instructions 142 to execute a NFT generator 154 and process image objects associated with a design diagram to generate a design non-fungible token (NFT) associated with the design diagram. The design NFT may be configured to verify a technical ownership of the design diagram and to allow a user device associated with the user to access and modify the design diagram. In one embodiment, the NFT based learning engine 134 may be implemented by the processor 132 by executing the learning system 146 with the NFT generator 154 to conduct image data processing on the design diagram and generate a test case with a test case NFT. The test case NFT is configured to verify a technical ownership of the test suite and the set of the test scripts. The server 130 may execute the NFT generator 154 to couple and store in the memory the design NFT and the test case NFT with user metadata information to facilitate a verification of the ownership associated with the test suite and design diagram.

Convert Image Objects of Design Diagrams to Text Objects

In one embodiment, the operation begins when the server 130 obtains a plurality of image objects 162 associated with a design diagram 160 and a user profile 158 of a user from a database 156. The plurality of the image objects 162 represents a workflow of the design diagram 160 which comprises a plurality of diagram shapes, functional diagram contexts, and logic conditions between different diagram shapes and functional diagram contexts. The NFT based learning engine 134 may be implemented by the processor 132 executing the learning model 148 with the OCR pattern-based algorithm 150 to convert the plurality of the image objects 162 associated with the design diagram 160 into corresponding text objects 164.

Training a Learning System to Generate Test Suites

The corresponding description below describes a brief explanation of the operations of the learning system 146. The training data objects 174 may include a plurality of sets of image objects associated with a plurality of design diagrams. Each set of training data objects may include diagram shapes, functional diagram contexts, and logic conditions between different diagram shapes and functional diagram contexts, etc. Each set of the training data objects is associated with a corresponding design diagram and include a corresponding set of image objects and a corresponding set of text objects. In a training process, the NFT based learning engine 134 may be executed by the processor 132 to train the learning model 148 with the training data objects 174 to understand the workflow from the design diagrams and convert them into the corresponding set of text objects. The server 130 may train the learning model 148 with the OCR pattern-based algorithm 150 and the NLP algorithm 152 to process the plurality of the sets of the training data objects and generate corresponding test suite associated with each workflow of the corresponding design diagram.

Generate Test Suites from Design Diagrams

The NFT based learning engine 134 may be implemented by the processor 132 executing the learning model 148 designed with the natural language processing (NLP) algorithm 152 to process the corresponding set of text objects associated with the design diagram to generate corresponding text datasets 166 which correspond to the workflow of the design diagram 160. The NLP algorithm 152 may be implemented with the learning model 148 to generate a test suite 168 with corresponding test scripts 170. In some embodiments, the NLP algorithm 152 supports the generation of test scripts through a user interface application, an application programming interface (API) testing or database testing.

In some embodiments, the processor 132 may execute the NLP algorithm 152 to perform contextual recognition on the corresponding text datasets to generate an automatic test suite with the set of the test scripts associated with the design diagram. For example, the processor 132 may perform the contextual recognition by breaking the diagram contexts of the design diagram into corresponding words and sentences using tokenization technology. The processor 132 may identify the words of the sentences and the list of the words using morphology techniques. The processor 132 may analyze the grammatical structure of the sentences using syntax or dependency parsing techniques. The processor 132 may apply semantic role labeling to the corresponding words and sentences using Semantic Role Labeling (SRL). The processor 132 may analyze a logical structure of the corresponding words and sentences to generate the test suite with the set of the test scripts associated with the design diagram by applying a discourse analysis which is a logical structure for examining real content generated.

Generating NFTs for Design Diagrams and Test Suites

The NFT based learning engine 134 may be implemented by the processor 132 executing a non-fungible token (NFT) generator 154 to generate non-fungible tokens corresponding to design diagrams 160 and test suites 168 to verify the corresponding technical ownership in order to further allow a user device to access the design diagrams 160 and test suites 168. The NFT generator 154 may be implemented to generate non-fungible tokens 172 using smart contract according to a particular technical standard, such as an ERC20 technical standard. The technical standard defines common rules for the non-fungible tokens 172. These common rules include how the non-fungible tokens may be transferred, how interactions with the non-tokens are approved, how a user device accesses a design diagram or a test suite with a non-fungible token, etc. The rules may be defined to restrict users to change the design diagrams. Based on the rules defined for the NFTs, only a user or specific group of users with the corresponding technical ownership are entitled to access and modify the design diagrams 160 and test suites 168 via a user device 120 before a freeze date of an application product.

Verify Ownerships of Design Diagrams and Test Suites with NFTs

The server 130 tracks requirement documents including design diagrams, test suites and other application documents associated with an application product for each release. Different technical ownerships with different NFTs for the design diagrams and test suites may facilitate user responses to requirement changes and quality assessment when any changes to the application product occur for each release. The test suite maintenance may become easier since the server 130 may verify a technical ownership with corresponding unique NFTs quickly in response to detecting a check-in signal 124 to access a design diagram 160 from a user device 120 associated with a user 102. For example, the server 130 may detect one or more interactions associated with a design diagram and verify the corresponding ownership of the image diagram based on the associated design NFT stored in the user profile to determine whether to allow the user device to securely access and modify the design diagram. The server 130 may detect one or more interactions associated with the test suite and verify the corresponding ownership of the test suite based on the associated test case NFT stored in the user profile to determine whether to allow the user device to securely access and modify the test suite.

Example Operational Flow for Generating NFT Based Test Suites from Design Diagrams FIG. 2 illustrates an example flow of a method 200 for generating NFT based test suites from design diagrams in the system 100. Modifications, additions, or omissions may be made to method 200. Method 200 may include more, fewer, or other operations. For example, operations may be performed by the server 130 in parallel or in any suitable order. While at times discussed as the system 100, processor 132, NFT based learning engine 134, learning system 146, NFT generator 154 or components of any of thereof performing operations, any suitable system or components of the system may perform one or more operations of the method 200. For example, one or more operations of method 200 may be implemented, at least in part, in the form of software instructions 142 of FIG. 1, stored on non-transitory, tangible, machine-readable media (e.g., memory 140 of FIG. 1) that when run by one or more processors (e.g., processor 132 of FIG. 1) may cause the one or more processors to perform operations 202-236.

The server may receive a plurality of design diagrams 160 and store them in a database 156. In response to receiving a design diagram 160, the NFT based learning engine 134 engine 134 is triggered to be executed by the server 130 to process the design diagram 160 associated with a user profile 158 and generate a NFT based test suite 168 from the design diagram 160.

The method 200 begins at operation 202 where the server 130 may create design diagrams 160 by the user device 120 by a user through a user interface application 144. The design diagrams are associated with an application product in a continuous integration/continuous deployment (CI/CD) pipeline process.

At operation 204, the server 130 obtains a plurality of image objects 162 associated with a first design diagram 160 and a first user profile 158 from the database 156. The plurality of the image objects 162 represents a workflow which comprises a plurality of diagram shapes, functional diagram contexts, and logic conditions between different diagram shapes and functional diagram contexts.

At operation 206, the server 130 executes a NFT generator 154 to generate a design non-fungible token (NFT) 172 associated with the first design diagram 160 and the first user profile 158. The design NFT 172 is configured to verify an ownership of the first design diagram and to allow a user device 120 associated with a first user to access and modify the first design diagram.

At operation 208, the server 130 executes a learning model 148 and an OCR pattern-based algorithm 150 to convert the plurality of image objects 162 associated with the first design diagram 160 into corresponding text objects 164.

At operation 210, the server 130 executes the learning model 148 to process the corresponding text objects 164 of the first design diagram 160 to generate a plurality of text datasets 166 corresponding to the workflow of the first design diagram 160.

At operation 212, the server 130 executes the learning model 148 with a natural language processing (NLP) algorithm 152 to analyze the text datasets 166 and generate a first test suite 168. The first test suite 168 includes a set of test scripts 170 corresponding to the first design diagram 160.

At operation 214, the server 130 executes the NFT generator 154 to generate a first test case NFT 172 associated with the test suite 168 and the set of the test scripts 170. The first test case NFT is configured to verify an ownership of the test suite.

At operation 222, the server 130 couples and stores in the memory 140 both the design NFT and the first test case NFT to ensure ownership verification which is required to be validated in the CI/CD pipeline process through the system 100. Both design NFT and the first test case NFT may be linked to and associated with corresponding metadata information to facilitate a verification of the ownership associated with the design diagram and the corresponding test suite. The metadata information may include one or more user login credentials stored in the user profile 158. At operation 224, the server 130 may derive the test suite 168 from the memory based on the design NFT and the first test case NFT to verify the ownership associated with the design diagram 160 and test suite 168. At operation 226, upon determining that the user 102 does not have the corresponding ownership associated with the design diagram and test suite, the server 130 may notify the user 102 by sending a message to the user device 120 via the network 110. At operation 228, upon verifying the corresponding ownership of the test suite with the user profile in response to a user access to the first test suit, the server 130 may derive the first test suite 168 with the test scripts 170 from the database 156 in the memory. Further, at operation 230, the server 130 may have test scripts automatically scheduled in a development platform. At operation 232, the server 130 may execute the test scripts for a deployment in a continuous integration and continuous deployment (CI/CD) system.

At operation 216, the server 130 receives a new version of the first design diagram associated with the first image profile from a user device 120 via the network 110. For example, at operation 234, the server 130 may detect a check-in signal 124 to access requirement documents including design diagrams, test suites and other application documents from a user device 120 via the network 110. At operation 236, the server 130 may detect a check-in signal 124 to access a user case diagram such as the first design diagram from the user device 120 via the network 110. The server 130 verifies the corresponding ownership associated with the first design diagram based on the design NFT stored in the first user profile and allow the user device 120 to access the first design diagram.

At operation 218, the server 130 may execute the learning model 148 to compare the first design diagram to the new version of the design diagram and determine one or more changes made to the first design diagram. For example, in response to verifying the corresponding ownership associated with the first design diagram, the server 130 may execute the learning system to compare the previous version of a design diagram with a new version of the design diagram.

At operation 220, the server 130 may determine whether to generate a new test suite or to modify a partial test suite based on a threshold and the one or more changes made to the first image profile. The threshold value may be defined based on a complexity level or a content size of a corresponding design diagram.

In one embodiment, the server 130 may generate the new version test suite based on the one or more changes made to the design diagram in response to determining that the one or more changes are above or equal to the threshold. The server 130 executes the NFT generator 154 to generate a second test case NFT associated with the new version test suite. The server 130 further couples and stores in the memory the design NFT and the second test case NFT associated with the new version test suite and the user profile with metadata information to facilitate a verification of the ownership associated with the new version test suite.

In one embodiment, the server 130 may modify the portion of the test suite corresponding to the one or more changes made to the first design diagram in response to determining that the one or more changes are below the threshold. The server 130 generates a third test case NFT associated with the portion of the test suite. The server 130 couples and stores in the memory the design NFT and the third test case NFT associated with the portion of the test suite and the user profile with metadata information to facilitate a verification of the ownership associated with the the test suite. Further, the server 130 may derive the new test suite or the modified test suite from the memory based on the design NFT and the second test case NFT or the third test case NFT stored in the user profile to verify the ownership associated with the corresponding test suite. The server 130 may have the new test suite or the modified test suite automatically scheduled in a development platform. The server 130 may execute the new test suite or the modified test suite for a deployment in a continuous integration and continuous deployment (CI/CD) system.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operable to store:
   a plurality of design diagrams, wherein each design diagram of the plurality of design diagrams is associated with at least one user profile;
   a plurality of user profiles, wherein each user profile of the plurality of user profiles is configured to permit a corresponding user to access and modify one or more corresponding design diagrams of the plurality of design diagrams;
   a plurality of sets of training data objects, wherein each set of training data objects of the plurality of sets of training data objects are associated with a corresponding design diagram and comprise a corresponding set of image objects and a corresponding set of text objects; and
   a learning system configured to conduct image data processing on the plurality of design diagrams to generate corresponding test suites, wherein the learning system comprises a learning model, a natural language processing algorithm, and an optical character recognition (OCR) pattern-based algorithm; and
   a processor operably coupled to the memory, the processor configured to:
   train the learning model with the plurality of sets of training data objects to understand one or more workflows from the plurality of design diagrams;
   obtain a plurality of image objects associated with a first design diagram and a first user profile of a first user, wherein the plurality of image objects represent a workflow from the one or more workflows which comprises a plurality of diagram shapes, a plurality of functional diagram contexts, and a plurality of logic conditions between different diagram shapes and different functional diagram contexts;

generate a design non-fungible token (NFT) associated with the first design diagram and the first user profile of the first user, wherein the design NFT is configured to verify an ownership associated with the first design diagram and to allow a user device associated with the first user to access and modify the first design diagram;

execute the OCR pattern-based algorithm to convert the plurality of image objects associated with the first design diagram into corresponding text objects;

execute the learning model to process the corresponding text objects of the first design diagram to generate a plurality of text datasets corresponding to a workflow of the first design diagram, wherein the learning model comprises a plurality of neural network layers that process the workflow of the first design diagram based on being trained with the plurality of sets of training data objects to understand the one or more workflows from the plurality of design diagrams;

execute the learning model with the natural language processing algorithm to analyze the plurality of text datasets and generate a first test suite which comprises a set of test scripts corresponding to the first design diagram, wherein the first test suite with the set of test scripts associated with the first design diagram is generated by the natural language processing algorithm performing contextual recognition on the plurality of text datasets;

generate a first test case NFT associated with the first test suite and the set of test scripts, wherein the first test case NFT is configured to verify an ownership associated with the first test suite;

derive the first test suite from the memory based on the design NFT and the first test case NFT to verify the ownership associated with the first design diagram and the first test suite; and execute the set of test scripts of the first test suite for an automatic deployment in a continuous integration and continuous deployment (CI/CD) system.

2. The system of claim 1, wherein the processor is further configured to:

couple and store in the memory, the design NFT and the first test case NFT associated with the first test suite with metadata information to facilitate a verification of the ownership associated with the first test suite, wherein the metadata information comprises one or more user login credentials stored in the first user profile of the first user.

3. The system of claim 1, wherein the processor is further configured to:

detect a check-in signal to access the first design diagram from the user device;

verify the design NFT associated with the first design diagram and the first user profile of the first user to verify the ownership associated with the first design diagram and allow the user device to access the first design diagram;

receive a new version of the first design diagram from the user device;

compare, by executing the learning model, the first design diagram to the new version of the first design diagram to determine one or more changes made to the first design diagram; and determine, based on a threshold and the one or more changes made to the first design diagram, whether to generate a new version of the first test suite or to modify a portion of the first test suite.

4. The system of claim 3, wherein the processor is further configured to, in response to determining that the one or more changes made to the first design diagram are above or equal to the threshold:

generate the new version of the first test suite based on the one or more changes made to the first design diagram;

generate a second test case NFT associated with the new version of the first test suite; and couple and store in the memory, the design NFT and the second test case NFT associated with the new version of the first test suite with metadata information to facilitate a verification of an ownership associated with the new version of the first test suite.

5. The system of claim 3, wherein the processor is further configured to, in response to determining that the one or more changes made to the first design diagram are below the threshold:

modify the portion of the first test suite corresponding to the one or more changes made to the first design diagram;

generate a second test case NFT associated with the portion of the first test suite; and couple and store in the memory, the design NFT and the second test case NFT associated with the portion of the first test suite with metadata information to facilitate a verification of the ownership associated with the first test suite.

6. The system of claim 1, wherein the contextual recognition on the plurality of text datasets comprises one or more of:

breaking the plurality of functional diagram contexts of the first design diagram into corresponding words and sentences;

identifying words of the sentences and a list of words;

analyzing grammatical structure of the sentences;

applying semantic role labeling to the corresponding words and sentences; or analyzing a logical structure of the corresponding words and sentences to generate the first test suite with the set of test scripts associated with the first design diagram.

7. A method comprising:

storing, in a memory, a plurality of design diagrams, wherein each design diagram of the plurality of design diagrams is associated with at least one user profile;

storing, in the memory, a plurality of user profiles, wherein each user profile of the plurality of user profiles is configured to permit a corresponding user to access and modify one or more corresponding design diagrams of the plurality of design diagrams;

storing, in the memory, a plurality of sets of training data objects, wherein each set of training data objects of the plurality of sets of training data objects are associated with a corresponding design diagram and comprise a corresponding set of image objects and a corresponding set of text objects;

storing, in the memory, a learning system configured to conduct image data processing on the plurality of design diagrams to generate corresponding test suites, wherein the learning system comprises a learning model, a natural language processing algorithm, and an optical character recognition (OCR) pattern-based algorithm;

training, by a processor, the learning model with the plurality of sets of training data objects to understand one or more workflows from the plurality of design diagrams;

obtaining, by the processor, a plurality of image objects associated with a first design diagram and a first user profile of a first user, wherein the plurality of image objects represent a workflow from the one or more workflows which comprises a plurality of diagram shapes, a plurality of functional diagram contexts, and a plurality of logic conditions between different diagram shapes and different functional diagram contexts;

generating, by the processor, a design non-fungible token (NFT) associated with the first design diagram and the first user profile of the first user, wherein the design NFT is configured to verify an ownership associated with the first design diagram and to allow a user device associated with the first user to access and modify the first design diagram;

executing, by the processor, the OCR pattern-based algorithm to convert the plurality of image objects associated with the first design diagram into corresponding text objects;

executing, by the processor, the learning model to process the corresponding text objects of the first design diagram to generate a plurality of text datasets corresponding to a workflow of the first design diagram, wherein the learning model comprises a plurality of neural network layers that process the workflow of the first design diagram based on being trained with the plurality of sets of training data objects to understand the one or more workflows from the plurality of design diagrams;

executing, by the processor, the learning model with the natural language processing algorithm to analyze the plurality of text datasets and generate a first test suite which comprises a set of test scripts corresponding to the first design diagram, wherein the first test suite with the set of test scripts associated with the first design diagram is generated by the natural language processing algorithm performing contextual recognition on the plurality of text datasets;

generating, by the processor, a first test case NFT associated with the first test suite and the set of test scripts, wherein the first test case NFT is configured to verify an ownership associated with the first test suite;

deriving, by the processor, the first test suite from the memory based on the design NFT and the first test case NFT to verify the ownership associated with the first design diagram and the first test suite; and executing, by the processor, the set of test scripts of the first test suite for an automatic deployment in a continuous integration and continuous deployment (CI/CD) system.

8. The method of claim 7, further comprising:
coupling and storing in the memory, the design NFT and the first test case NFT associated with the first test suite with metadata information to facilitate a verification of the ownership associated with the first test suite, wherein the metadata information comprises one or more user login credentials stored in the first user profile of the first user.

9. The method of claim 7, further comprising:
detecting, by the processor, a check-in signal to access the first design diagram from the user device;
verifying, by the processor, the design NFT associated with the first design diagram and the first user profile of the first user to verify the ownership associated with the first design diagram and allow the user device to access the first design diagram;

receiving, by the processor, a new version of the first design diagram from the user device;

comparing, by the processor and executing the learning model, the first design diagram to the new version of the first design diagram to determine one or more changes made to the first design diagram; and determining, by the processor and based on a threshold and the one or more changes made to the first design diagram, whether to generate a new version of the first test suite or to modify a portion of the first test suite.

10. The method of claim 9, further comprising:
in response to determining that the one or more changes made to the first design diagram are above or equal to the threshold:
generating, by the processor, the new version of the first test suite based on the one or more changes made to the first design diagram;
generating, by the processor, a second test case NFT associated with the new version of the first test suite; and
coupling and storing in the memory, the design NFT and the second test case NFT associated with the new version of the first test suite with metadata information to facilitate a verification of an ownership associated with the new version of the first test suite.

11. The method of claim 9, further comprising:
in response to determining that the one or more changes made to the first design diagram are below the threshold:
modifying, by the processor, the portion of the first test suite corresponding to the one or more changes made to the first design diagram;
generating, by the processor, a second test case NFT associated with the portion of the first test suite; and
coupling and storing in the memory, the design NFT and the second test case NFT associated with the portion of the first test suite with metadata information to facilitate a verification of the ownership associated with the first test suite.

12. The method of claim 7,
wherein the contextual recognition on the plurality of text datasets comprises one or more of:
breaking, by the processor, the plurality of functional diagram contexts of the first design diagram into corresponding words and sentences;
identifying, by the processor, words of the sentences and a list of words;
analyzing, by the processor, grammatical structure of the sentences;
applying, by the processor, semantic role labeling to the corresponding words and sentences; or
analyzing, by the processor, a logical structure of the corresponding words and sentences to generate the first test suite with the set of test scripts associated with the first design diagram.

13. A non-transitory machine-readable medium that stores instructions that when executed by a processor, causes the processor to:
store, in a memory, a plurality of design diagrams, wherein each design diagram of the plurality of design diagrams is associated with at least one user profile;
store, in the memory, a plurality of user profiles, wherein each user profile of the plurality of user profiles is configured to permit a corresponding user to access and modify one or more corresponding design diagrams of the plurality of design diagrams;

store, in the memory, a plurality of sets of training data objects, wherein each set of training data objects of the plurality of sets of training data objects are associated with a corresponding design diagram and comprise a corresponding set of image objects and a corresponding set of text objects;

store, in the memory, a learning system configured to conduct image data processing on the plurality of design diagrams to generate corresponding test suites, wherein the learning system comprises a learning model, a natural language processing algorithm, and an optical character recognition (OCR) pattern-based algorithm;

train the learning model with the plurality of sets of training data objects to understand one or more workflows from the plurality of design diagrams;

obtain a plurality of image objects associated with a first design diagram and a first user profile of a first user, wherein the plurality of image objects represent a workflow from the one or more workflows which comprises a plurality of diagram shapes, a plurality of functional diagram contexts, and a plurality of logic conditions between different diagram shapes and different functional diagram contexts;

generate a design non-fungible token (NFT) associated with the first design diagram and the first user profile of the first user, wherein the design NFT is configured to verify an ownership associated with the first design diagram and to allow a user device associated with the first user to access and modify the first design diagram;

execute the OCR pattern-based algorithm to convert the plurality of image objects associated with the first design diagram into corresponding text objects;

execute the learning model to process the corresponding text objects of the first design diagram to generate a plurality of text datasets corresponding to a workflow of the first design diagram, wherein the learning model comprises a plurality of neural network layers that process the workflow of the first design diagram based on being trained with the plurality of sets of training data objects to understand the one or more workflows from the plurality of design diagrams;

execute the learning model with the natural language processing algorithm to analyze the plurality of text datasets and generate a first test suite which comprises a set of test scripts corresponding to the first design diagram, wherein the first test suite with the set of test scripts associated with the first design diagram is generated by the natural language processing algorithm performing contextual recognition on the plurality of text datasets;

generate a first test case NFT associated with the first test suite and the set of test scripts, wherein the first test case NFT is configured to verify an ownership associated with the first test suite;

derive the first test suite from the memory based on the design NFT and the first test case NFT to verify the ownership associated with the first design diagram and the first test suite; and execute the set of test scripts of the first test suite for an automatic deployment in a continuous integration and continuous deployment (CI/CD) system.

14. The non-transitory machine-readable medium of claim 13, wherein the instructions when executed by the processor further cause the processor to:

couple and store in the memory, the design NFT and the first test case NFT associated with the first test suite with metadata information to facilitate a verification of the ownership associated with the first test suite, wherein the metadata information comprises one or more user login credentials stored in the first user profile of the first user.

15. The non-transitory machine-readable medium of claim 13, wherein the instructions when executed by the processor further cause the processor to:

detect a check-in signal to access the first design diagram from the user device;

verify the design NFT associated with the first design diagram and the first user profile of the first user to verify the ownership associated with the first design diagram and allow the user device to access the first design diagram;

receive a new version of the first design diagram from the user device;

compare, by executing the learning model, the first design diagram to the new version of the first design diagram to determine one or more changes made to the first design diagram; and determine, based on a threshold and the one or more changes made to the first design diagram, whether to generate a new version of the first test suite or to modify a portion of the first test suite.

16. The non-transitory machine-readable medium of claim 15, wherein the instructions when executed by the processor further cause the processor to:

in response to determining that the one or more changes made to the first design diagram are above or equal to the threshold:

generate the new version of the first test suite based on the one or more changes made to the first design diagram;

generate a second test case NFT associated with the new version of the first test suite; and couple and store in the memory, the design NFT and the second test case NFT associated with the new version of the first test suite with metadata information to facilitate a verification of an ownership associated with the new version of the first test suite.

17. The non-transitory machine-readable medium of claim 15, wherein the instructions when executed by the processor further cause the processor to:

in response to determining that the one or more changes made to the first design diagram are below the threshold:

modify the portion of the first test suite corresponding to the one or more changes made to the first design diagram;

generate a second test case NFT associated with the portion of the first test suite; and couple and store in the memory, the design NFT and the second test case NFT associated with the portion of the first test suite with metadata information to facilitate a verification of the ownership associated with the first test suite.

18. The non-transitory machine-readable medium of claim 13, wherein the contextual recognition on the plurality of text datasets comprises one or more of:

breaking the plurality of functional diagram contexts of the first design diagram into corresponding words and sentences;

identifying words of the sentences and a list of words;

analyzing grammatical structure of the sentences;

applying semantic role labeling to the corresponding words and sentences; or analyzing a logical structure of the corresponding words and sentences to generate the first test suite with the set of test scripts associated with the first design diagram.

\* \* \* \* \*